(12) United States Patent
Voicu (10) Patent No.: US 10,968,008 B2
(45) Date of Patent: Apr. 6, 2021

(54) REUSABLE BARREL FOR POTABLE LIQUIDS

(71) Applicant: Gheorghe Voicu, Great Neck, NY (US)

(72) Inventor: Gheorghe Voicu, Great Neck, NY (US)

(73) Assignee: Gheorghe Voicu, Great Neck, NY (US)

( * ) Notice: Subject to any disclaimer, the term of this patent is extended or adjusted under 35 U.S.C. 154(b) by 540 days.

(21) Appl. No.: 15/706,221

(22) Filed: Sep. 15, 2017

(65) Prior Publication Data

US 2019/0084719 A1 Mar. 21, 2019

(51) Int. Cl.
*C12H 1/22* (2006.01)
*B65D 45/02* (2006.01)
*B65D 8/00* (2006.01)

(52) U.S. Cl.
CPC ............ *B65D 15/10* (2013.01); *B65D 15/24* (2013.01); *C12H 1/22* (2013.01)

(58) Field of Classification Search
CPC ................................ B65D 15/10; B65D 45/32
See application file for complete search history.

(56) References Cited

U.S. PATENT DOCUMENTS

| | | | | |
|---|---|---|---|---|
| 2,010,977 | A * | 8/1935 | Clark | B65D 9/32 217/80 |
| 4,998,643 | A * | 3/1991 | Pradel | B65D 45/32 220/320 |
| 5,092,488 | A * | 3/1992 | Pradel | B65D 45/32 220/320 |
| 5,174,461 | A * | 12/1992 | Sullivan | B65D 7/045 217/3 CB |
| 5,556,494 | A * | 9/1996 | Schutz | B29C 65/20 156/69 |
| 7,240,609 | B2 | 7/2007 | Berecz | |
| 10,479,565 | B2 * | 11/2019 | Deutsch | B65D 9/34 |
| 2007/0240579 | A1 * | 10/2007 | Boake | B65D 15/16 99/277.1 |
| 2010/0025396 | A1 * | 2/2010 | Boake | B65D 15/16 220/4.09 |
| 2014/0202337 | A1 * | 7/2014 | Roleder | B65D 9/04 99/277.1 |
| 2018/0009589 | A1 * | 1/2018 | Ho | B65D 81/2038 |
| 2018/0111722 | A1 * | 4/2018 | Deutsch | B65D 45/18 |
| 2018/0186509 | A1 * | 7/2018 | Deutsch | B65D 45/32 |

FOREIGN PATENT DOCUMENTS

DE 202014007935 U1 * 11/2014

* cited by examiner

*Primary Examiner* — Dana Ross
*Assistant Examiner* — Lawrence H Samuels
(74) *Attorney, Agent, or Firm* — Hoffmann & Baron, LLP (57) ABSTRACT

A barrel includes a non-wooden body having a sidewall defining an interior and terminating at a first open end. A flange extends from and about the sidewall adjacent the first end. A first head assembly includes a wooden head removably secured to the body at the first open end to seal the first open end. A first head retainer includes a top wall and a skirt wall extending therefrom and terminating in a securement structure projecting outwardly from the skirt wall. The top wall and skirt wall define a space to receive the first wooden head therein. A plurality of fasteners extends between the securement structure and the flange for securing the first head to the first end to cover the first open end.

23 Claims, 7 Drawing Sheets

REUSABLE BARREL FOR POTABLE LIQUIDS

FIELD OF INVENTION

The present disclosure provides a barrel for containing potable liquids, and more particularly, a barrel formed of metal and wood for storing and aging alcoholic beverages.

BACKGROUND OF THE INVENTION

Wooden barrels have been used for centuries in order to store potable liquids such as water, wine and distilled spirits. Such barrels typically include wooden staves forming the sidewall which are enclosed at the ends by wooden heads. Metal bands are fitted around the ends in order to secure the heads to the staves and to secure the staves together. In the production of wine and distilled spirits, in addition to storing the liquid, the flavor of the wood used to make the barrel is important in order to achieve the desired flavor. Wooden barrels are typically used two or three times in the production of wine or distilled spirits. After this, the barrels are then discarded. The entire barrel is discarded and must be replaced. This creates a significant expense for the manufacturer of the wine or distilled spirits as well as using up valuable natural resources.

Attempts have been made to develop barrels using non-wooden materials. For example, U.S. Patent Publication 2007/0240579 to Boake discloses a composite barrel having a body formed of a polymer material and wooden heads at each end. The wooden head is secured by a plurality of connectors for securing the outer ring to the body. The outer ring includes slots and must be rotated using a tool in order to secure the wooden head to the body. However, once the ring is locked in place, no additional force can be generated. Therefore if the wood on the head were to shrink, the seal would be less secure and leakage could occur.

Accordingly, it would be desirable to provide a barrel for potable liquids having at least some components which are reusable and having a secure, reliable seal to prevent leakage and being able to be efficiently refurbished for reuse.

SUMMARY

The present disclosure provides a barrel including a non-wooden body having a sidewall defining an interior and terminating at a first open end. A flange extends from and about the sidewall adjacent the first end. A first head assembly includes a wooden head removably secured to the body at the first open end to seal the first open end. A first head retainer includes a top wall and a skirt wall extending therefrom and terminating in a securement structure projecting outwardly from the skirt wall. The top wall and skirt wall define a space to receive the first wooden head therein. A plurality of fasteners extend between the securement structure and the flange for securing the first head to the first end to cover the first open end.

The present disclosure also provides a barrel for potable liquids including a stainless steel body having a sidewall defining an interior and terminating at a first and second opposed open ends. A first flange extends from and about the sidewall adjacent the first end. A second flange extends from and about the sidewall adjacent the second end. A first head assembly includes a wooden head removably secured to the body at the first open end to seal the first open end. The first head assembly includes a first head retainer bounding a perimeter of the first wooden head and having a first securement structure extending therefrom. A second head assembly includes a wooden head removably secured to the body at the second open end to seal the second open end. The second head assembly includes a second head retainer bounding a perimeter of the second wooden head and having a second securement structure extending therefrom. A first head retainer bounds a perimeter of the first wooden head and having a first securement structure extending therefrom. A plurality of fasteners extends between the first securement structure and the first flange for securing the first head to the first end to cover the first open end. At least one of the plurality of fasteners includes a fastener biasing device exerting a biasing force on the first head assembly urging the first wooden head into sealing engagement with the body. A plurality of fasteners extending between the second securement structure and the second flange for securing the second head to the second end to cover the second open end. At least one of the plurality of fasteners includes a fastener biasing device exerting a biasing force on the second head assembly urging the second wooden head into sealing engagement with the body.

DETAILED DESCRIPTION

Figure 1:
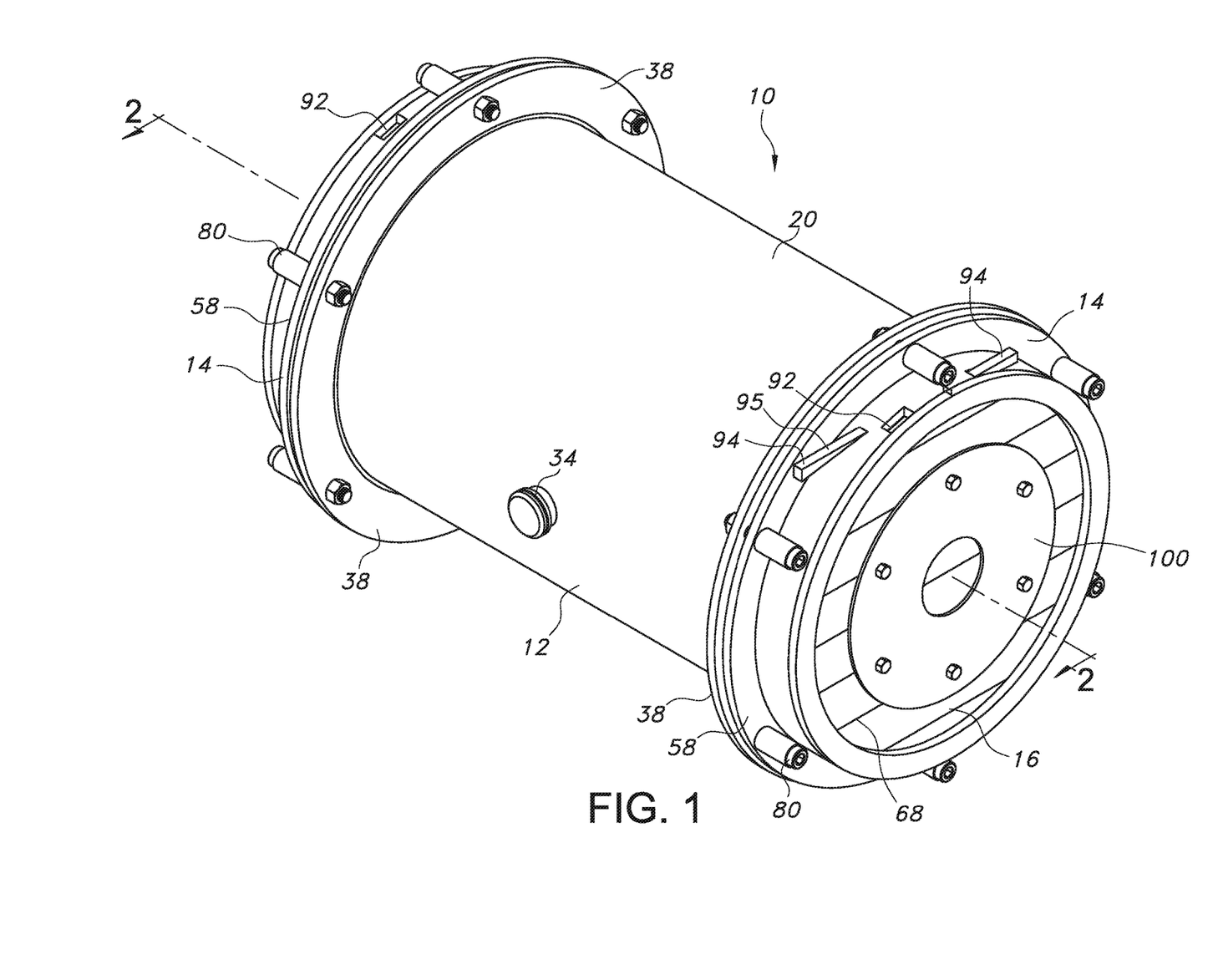
FIG. 1 is a perspective drawing of the barrel of the present invention.
Figure 2:
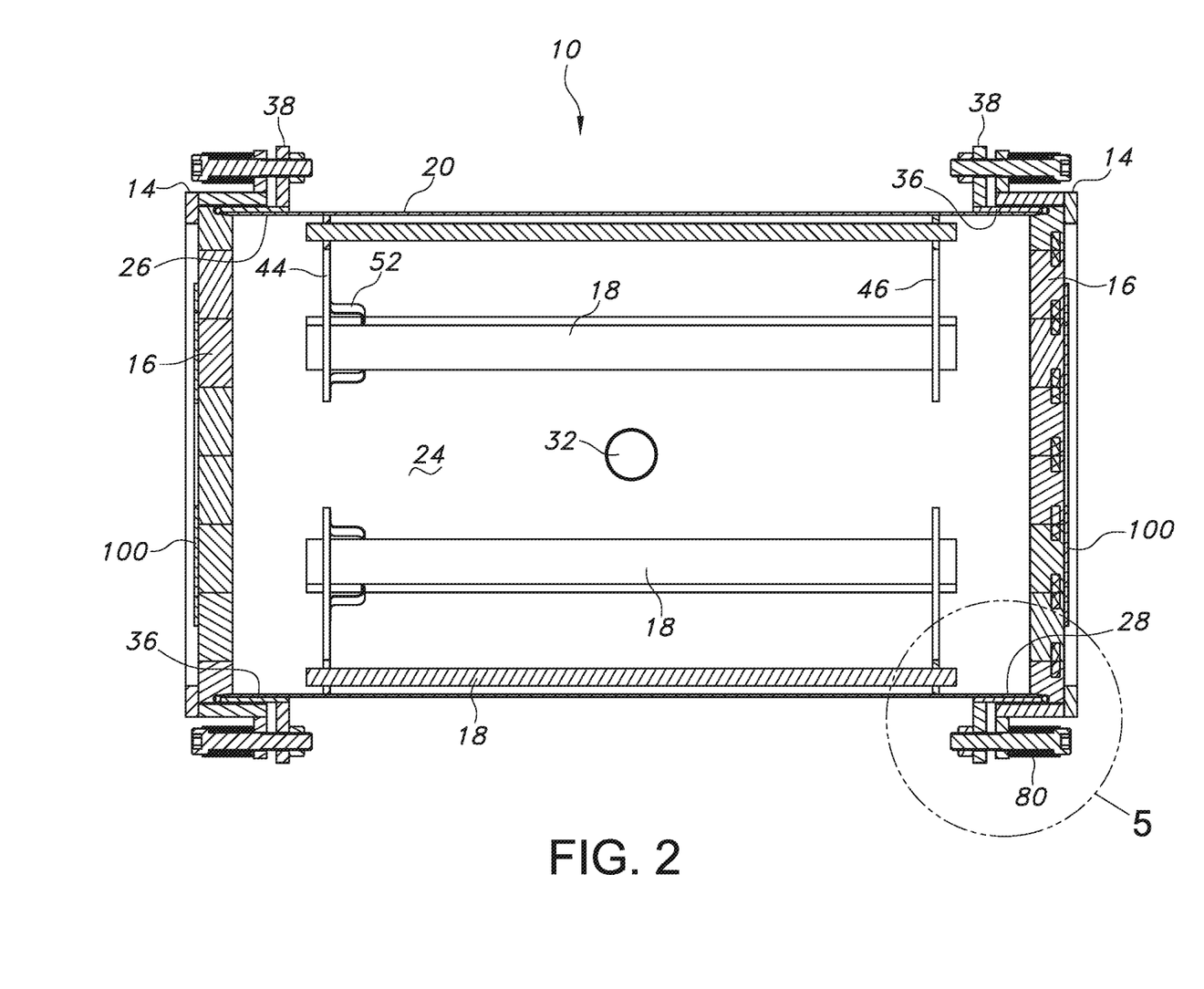
FIG. 2 is a cross-sectional view of the barrel taken along line 2-2 of FIG. 1.
Figure 3:
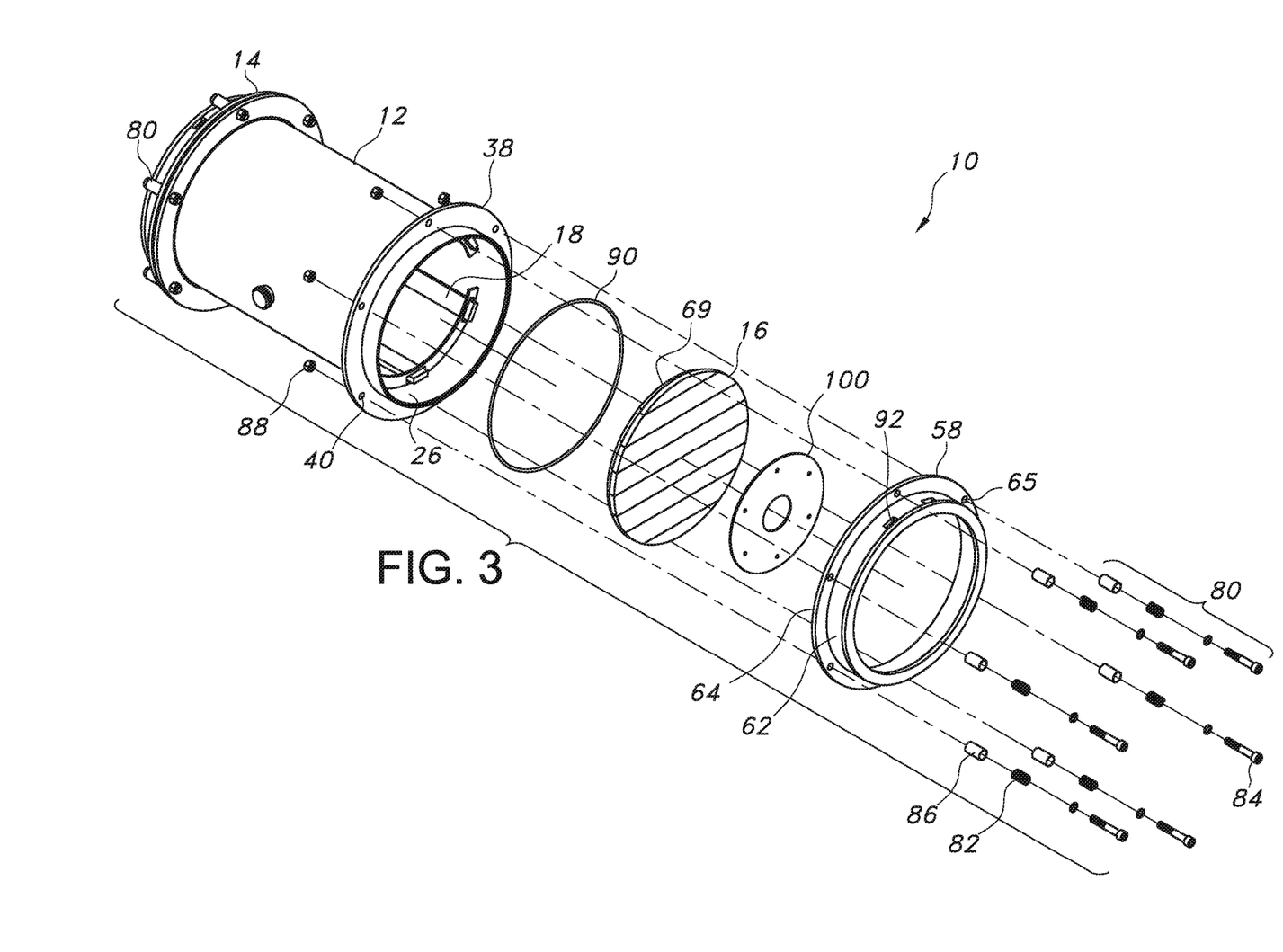
FIG. 3 is an exploded perspective view of the barrel.

With reference to FIGS. 1-3, a barrel 10 for holding potable liquids including reusable components is shown therein. The barrel 10 may be used in the production of wine and distilled spirits. More particularly, the barrel 10 may be used as a fermentation container for wine and also to store wine and spirits to permit aging and flavoring of the contents. The barrel 10 includes a barrel body 12 formed of a non-wooden material and two head assemblies 14 secured thereto. The head assemblies 14 may each include wooden head 16 and be easily secured and removed from the barrel body 12. The barrel 10 may also include therein a plurality of wooden staves 18 in order to provide flavoring to the potable liquid stored therein. The barrel's wooden components are replaceable so that the barrel 10 may be reused numerous times.

Figure 6:
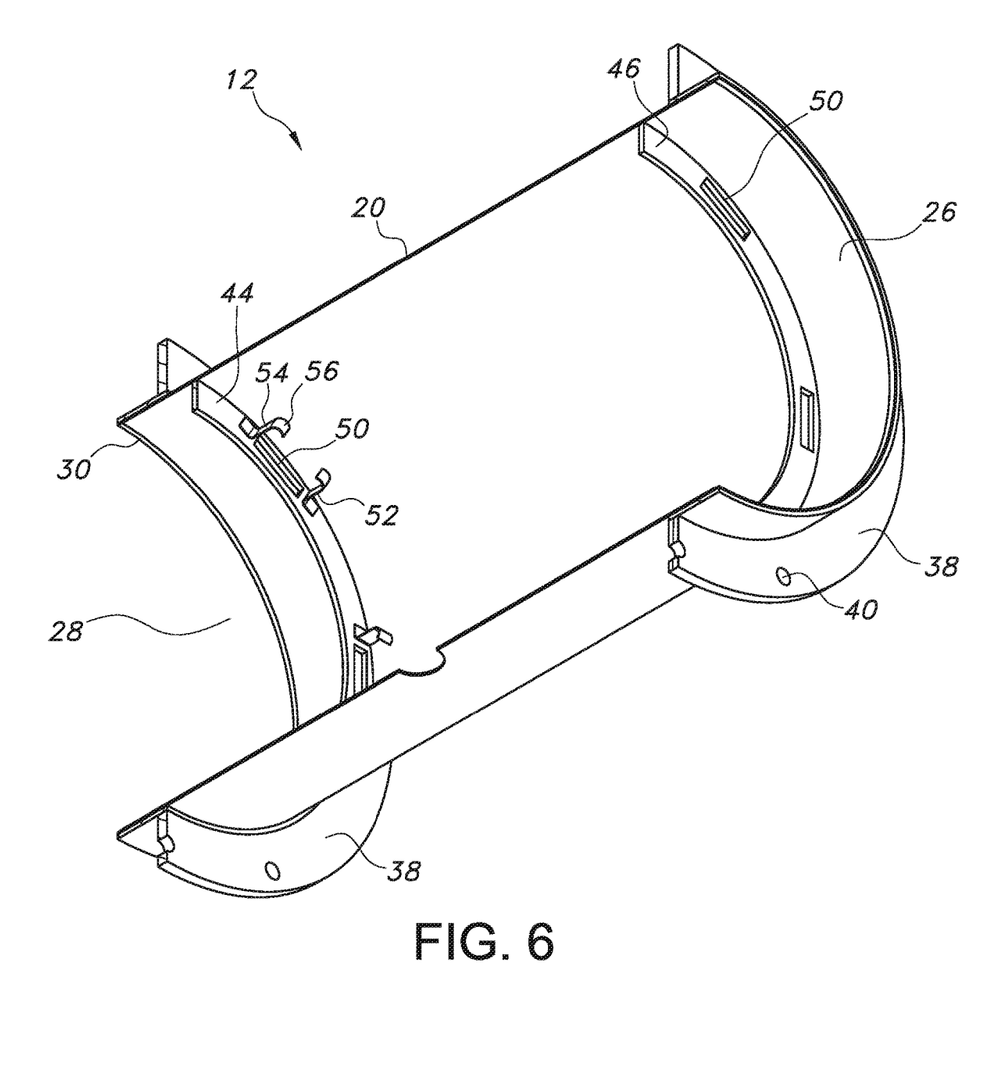
FIG. 6 is a perspective cross-sectional view of the barrel body.

Also, referring to FIG. 6, the barrel body 12 may include a sidewall 20 having a generally tubular shape. Alternatively, the body could be formed in other shapes such as a traditional barrel shapes, elliptical or rectangular. The head assemblies 14 may be configured to accommodate the shape of the barrel body. The sidewall 20 defines a barrel interior 24 and a first and second open end 26, 28. The ends are defined by a rim 30 surrounding the open ends. The sidewall 20 may further include a bunghole 32 which is sealable by a removable cap 34. The barrel body 12 may be formed of a non-wooden material such as stainless steel or other food grade non-wooden material. The barrel body 12 material also may be gas and liquid impermeable, such as made of stainless steel, in order to reduce the angle's share, i.e., the amount of liquid lost through absorption and evaporation, from that which occurs in traditional all wooden barrels.

As shown in FIG. 2, the barrel ends 26 and 28 may each have a reinforcing collar 36 secured thereto which surrounds the barrel body 12 and increases the strength and thickness of the barrel ends. Extending from each reinforcing collar 36 is a flange 38 which extends about the perimeter of the barrel body 12. The flanges 38 may include a plurality of apertures 40 in order to accommodate fastener assemblies 80 for removably securing the head assembly 14 to the barrel body 12.

Figure 5:
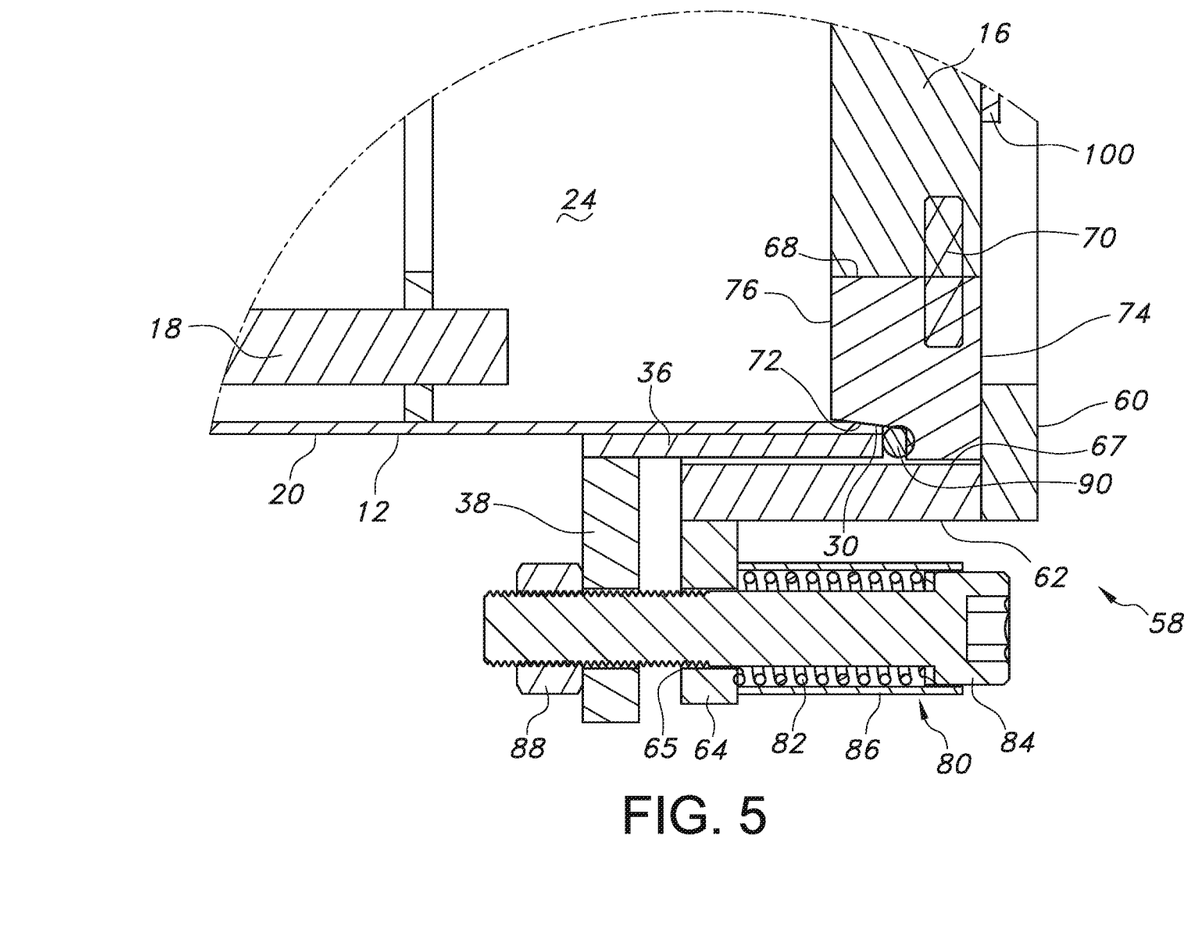
FIG. 5 is a detail view of the head retainer assembly.
Figure 7:
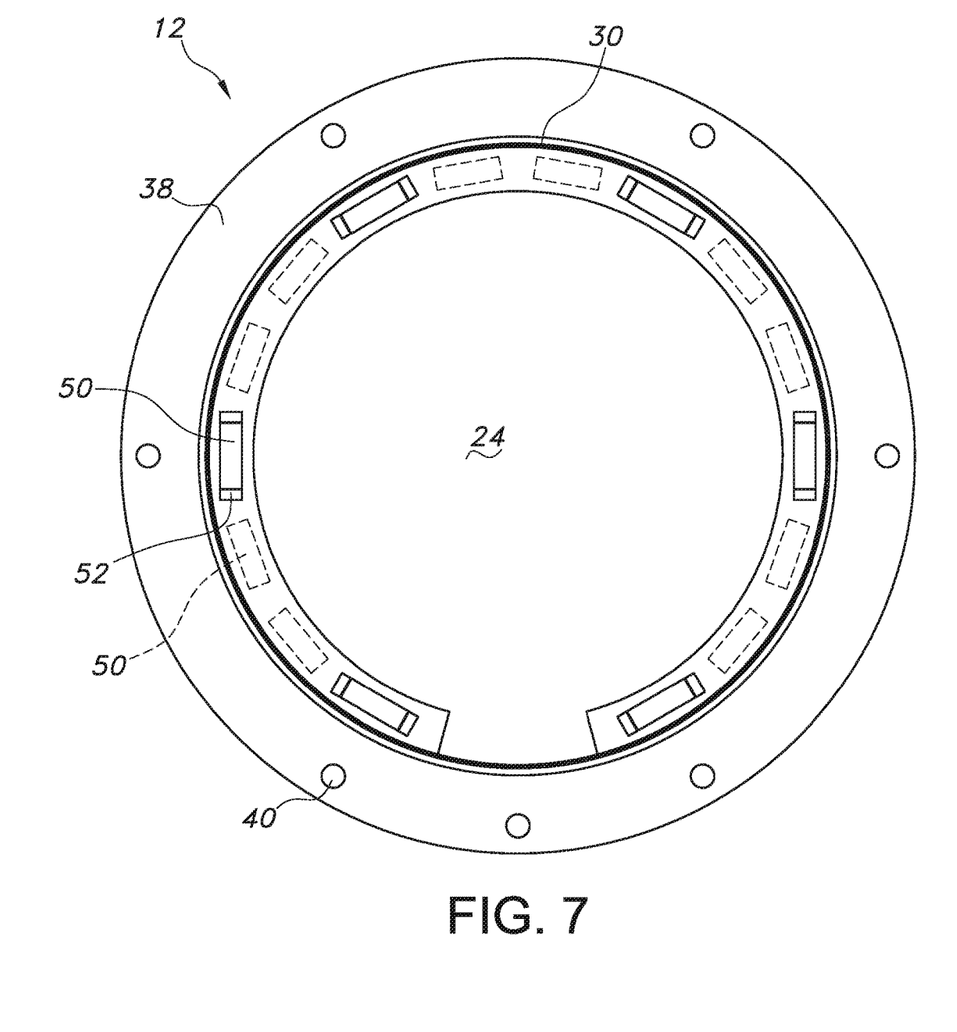
FIG. 7 is an elevational end view of the barrel body.

With reference to FIGS. 2, 6, and 7, the barrel body interior 24 may accommodate a plurality of wooden staves 18. In order to secure the staves 18 in the barrel interior 24, the barrel body may include in its interior a first 44 and second 46 stave holding projection. The first 44 and second 46 stave holding projections may be secured to a barrel sidewall inner surface 48 and may extend about a portion of an interior perimeter of the barrel body 12. The first 44 and second 46 holding projections may include a plurality of slots 50 therein for receiving the staves 18. The number of slots may be varied depending on the liquid to be stored or aged in the barrel 10. It is contemplated that the number of slots 50 could be such that if each received a stave 18, staves 18 would entirely surround the barrel interior. Staves 18 may be formed of elongate boards of wood and are used in order to impart a desired flavor to the liquid stored or aged within the barrel 10. In the first holding projection 44, the slots 50 on the first projection may be bounded by clips 52 which retain the staves 18 in place. The clips 52 include resilient members 54 which extend over the slot to which they are adjacent. The clips 52 may resiliently deflect in order to permit a stave 18 to extend therethrough. The clips engage the stave in order to provide a biased force thereon in order to retain the stave in place. The retainer clips 52 may be formed of a stainless steel spring material. The retaining clips 52 may have rounded ends 56 in order to permit the staves 18 to be slid in and out of the slots 50. The rounded ends 56 may turn inwardly toward each other as shown in FIG. 5. Alternatively, the rounded ends 56 may turn away from each other. The number of slots 50 may be varied depending on how many staves are desired to be placed within the barrel 10. For example, the number could be increased in order to give a user greater flexibility in the number of staves to be used. Therefore, by varying the size and number of staves, a user can influence the taste of the wine or spirits. It is contemplated that a stave need not be placed in every slot 50 as the number of staves can be modified depending on the liquid being stored within the barrel and the amount of flavor to be imparted to the liquid.

Figure 4:
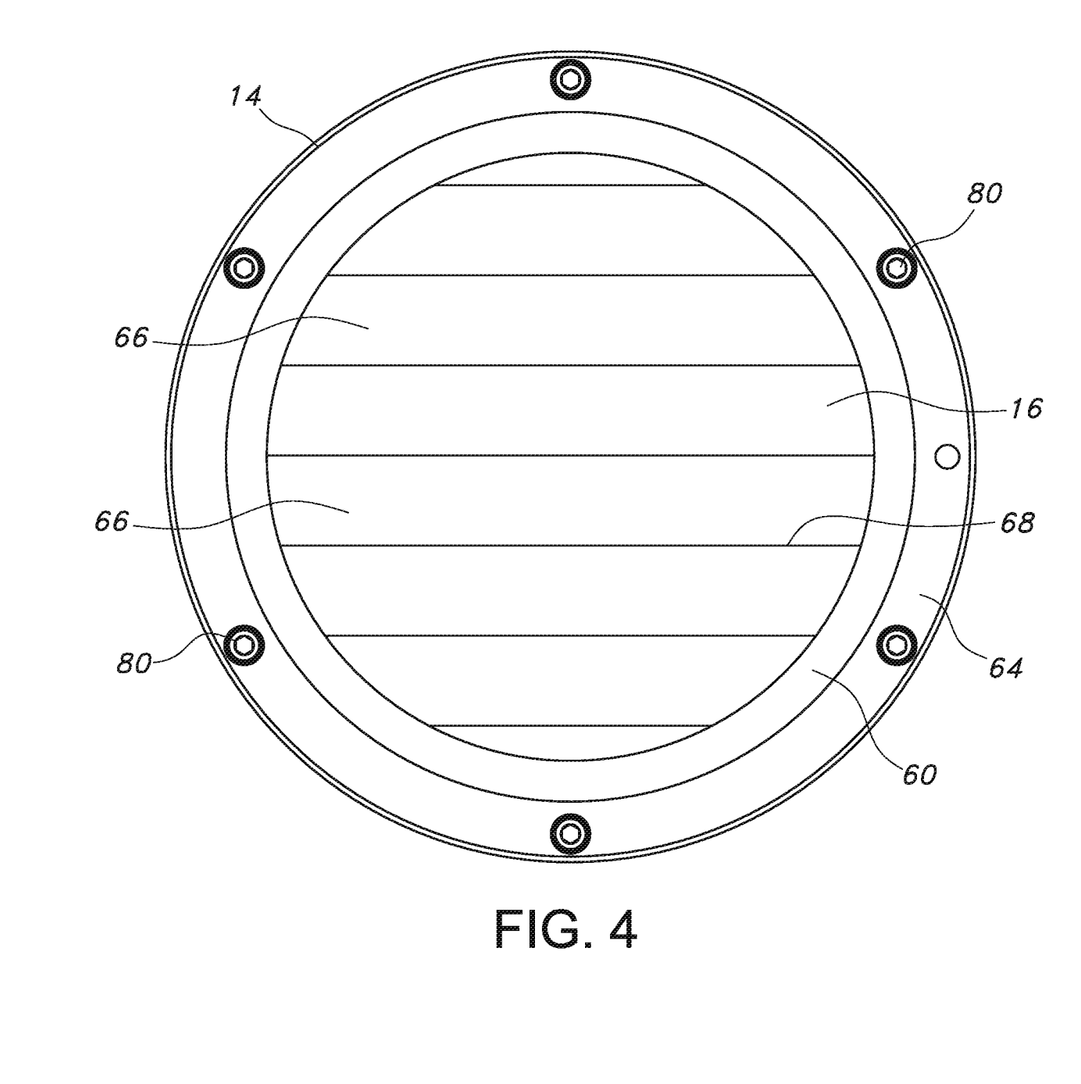
FIG. 4 is an end view of the barrel.

With reference to FIGS. 1, 4, and 5, the barrel body 12 is sealed at its ends 26 and 28 by the head assemblies 14. Each head assembly 14 includes a head retainer 58 for holding a wooden head 16. The head retainers 58 may be formed of a steel member and have a top wall 60 having an open center. The top wall 60 is bounded by a perimeter skirt wall 62 depending therefrom. The skirt wall 62 may terminate in an outwardly extending securement structure which may be in the form of a ring 64. It is contemplated that the securement structure 64 could be in the form of a plurality of discrete members spaced around the body 12. The top wall 60, skirt 62, and ring 64 form a rigid structure having a Z-shaped cross-section as shown in FIG. 5. The ring 64 may include a plurality of apertures 65 formed therein. The top wall 60 and skirt 62 define a space 67 for holding the wooden head 16 inserted therein. The wooden heads 16 may be formed of a plurality of wooden planks 66 having longitudinal edges 68 which adjoin each other. The use of wooden heads on the ends of the barrel body 12 permit for a small amount of air to pass therethrough into the barrel interior for oxygenation. Oxygenation of the liquid in the barrel is important in the production of wine and distilled spirits. The amount of oxygenation must be controlled since too much oxygen can lead to oxidation and too little oxygen can lead to reduction, both of which degrade the quality of the liquid inside the barrel. In addition, since the body is made of a non-wooden material, the amount of oxygen passing to the liquid can be better controlled than in traditional all wooden barrels.

The wooden planks 66 may be held together by fastening members 70 such as dowels. Alternatively, the planks 66 could be joined by a tongue and groove configuration. The wooden heads 16 may have a circular configuration as shown in FIG. 3. The perimeter of the wooden head 16 may have a tapered sidewall 72 which narrows as the sidewall of the wooden head goes from the top of the outer surface 74 to the inner surface 76. The tapered sidewall 72 is configured such that it engages the rim 30 of the barrel body 12 when the head assembly 14 is attached thereto as shown in FIG. 5.

In order to enclose and seal the barrel body 12, a head assembly 14 may be placed over each of the barrel ends 26 and 28 such that the ring apertures 65 align with the flange apertures 40 of the barrel body. The wooden head tapered sidewall 72 is urged into the barrel ends creating an interference fit. Fastener assemblies 80 may then be inserted in the apertures 65 and 40 to secure the head assemblies 14 to the barrel body 12 creating a liquid-tight seal. The perimeter of the wooden heads is bounded by and retained within the skirt wall 62. Therefore, the wooden head 16 does not extend to the fastener assemblies 80 as shown in FIG. 2. Accordingly, the wooden heads 16 may have a simple perimeter shape, e.g. round, that does not need to be formed to provide clearance for the fastener assemblies 80.

With reference to FIGS. 3 and 5, the fastener assemblies 80 may include a biasing device 82. In one embodiment, each fastener assembly 80 may include a bolt 84 extending through the biasing device 82 in the form of a coil spring. A sleeve 86 extends about the coil spring 82 and bolt 84. The biasing device 82 exerts a force acting in a direction to urge the wooden head 16 into further engagement with the rim 30 and toward the barrel interior 24. The threads of the bolt 84 extend through the apertures of the flange 40 and ring 60, and engage a nut 88. When the fastener assemblies are tightened, the wooden head 16 is urged into the barrel interior 24 in engagement with the rim 30. A gasket 90 may be disposed about the wooden head sidewall adjacent such that the gasket 90 sits between the wooden head and the rim of the barrel. The gasket 90 may be formed of natural or synthetic resilient material, such as a river reed or silicone. The tightening of the fastener assemblies 80 drives the wooden head 16 into the barrel and compresses the spring. The fastener assemblies 80 are tightened until a sufficient torque is applied, securely retaining the head assembly 14 onto the barrel body 12.

Due to the physical nature of wood, this material can expand and contract based on various conditions including temperature and humidity. This rate of dimensional change due to environmental elements is different than that of the non-wooden barrel body 12 to which the wooden head 16 is attached. The biasing device 82 of the fastener assemblies 80 allows for the difference in expansion rates to be accommodated. For example, should the wood material contract, the tension on the biasing devices 82 will tend to urge the wooden head further into the interior thereby maintaining a proper seal. Conversely, if the wooden head should expand, the biasing devices 82 accommodate the movement by compressing to permit the wooden head 16 to expand and move slightly away from the barrel interior, thus avoiding cracking. The biasing force will also ensure that a sufficient amount of force is maintained to properly seal the end of the barrel. It is also contemplated that if the barrel 10 will be used in an environment that will not experience significant temperature variations, the use of the biasing device 82 can be eliminated.

The rigid structure of the head retainers 58 and the biased nature of the fastener assemblies 80 allows for the number of fastening assemblies to be limited in number and still maintain a proper seal to prevent leakage. Therefore, removal of the head assemblies to place the staves 18 and the wooden heads 16 can be performed relatively quickly. This permits the barrel 10 to be reused numerous times in an efficient manner.

As shown in FIGS. 1 and 3, the head retainer 58 may include a plurality of openings 92 in the skirt 62. These openings 92 may be disposed such that they engage a longitudinal side edge of an end plank 69 (FIG. 3) forming the wooden head 16. These openings 92 may accommodate wedges 94 that can be forced therein to drive the planks 66 forming the wooden head toward each other. This creates a tighter engagement between the plank edges in order to reduce the chance of leakage though wooden heads 16. The wedges 94 having tapered surfaces 95 may be driven in between the skirt 62 and the perimeter of the wooden head 16 and generally tangential to the perimeter of the wooden head. The wedges 94 may be made of wood, and excess portions of the wedges 94 extending beyond the openings 92 can be cut off after insertion.

As shown in FIGS. 1 and 2, the head assemblies 14 may further include an air impermeable cover 100 that may be removably positioned over the wooden heads in order to cover a portion of this outer surface. In some applications, it may be desirable in order to reduce the amount of oxygen transfer through the wooden heads 16. The cover 100 may be formed of a material which does not permit air to pass therethrough, such as metal or plastic. Also, covers 100 of different sizes may be provided to adjust the amount of exposed surface area of the heads and thus control the amount of air passing through the wooden heads 16.

The barrel 10 of the present disclosure when fully assembled provides a container which permits for the storage and aging of potable liquid such as wines and distilled spirits. The wooden components may be easily replaced so the barrel 10 may be reused. In order to refurbish the barrel by replacing the wooded components, one would untighten the bolts 84 to release the head assemblies 14 from the barrel body 12. The wooden staves 18 may then be slid out from the slots. The barrel body may then be cleaned and sanitized in a manner known in the art. New wooden staves 18 of the desired composition and number may then be slid into the slots. Prior to insertion the staves may be toasted or otherwise prepared to impart the desired flavor to the liquid. The used wooden heads 16 may be removed from the head retainers 58 and the gaskets 90 may be removed. A new wooden head may be inserted in the retainer and a new gasket installed. The head assemblies 58 with the new wooden heads 16 may next be placed onto the open ends of the barrel body 12. The fastener assemblies bolts 84 may be placed through the apertures and secured by the nuts 88. The bolts may be torqued down to urge the wooden head tapered sidewall 72 into the barrel ends and create a seal. The liquid may be introduced into the barrel 10 through the bunghole 32 and the cap 34 tightened. Since only the wooden components need to be replaced, the barrel 10 can be reused many times in an economical manner. This reduces the amount of natural resources that are needed for production and has less impact on the environment.

While there have been described what is presently believed to be the preferred embodiments of the invention, those skilled in the art will realize that various changes and modifications may be made to the invention without departing from the invention, and it is intended to claim all such changes and modifications that fall within the scope of the invention.

What is claimed is:

1. A barrel comprising:
   a body formed of a non-wooden material having a body sidewall defining an interior and terminating at a first open end;
   a flange extending from the body sidewall adjacent the first open end;
   a first head assembly including a first wooden head removably secured to the body at the first open end to seal the first open end;
   a first head retainer including a top wall and a skirt wall extending from the top wall, and the skirt wall terminating in a securement structure projecting outwardly from the skirt wall, the top wall and skirt wall defining a space to receive the first wooden head therein;
   a plurality of fasteners extending between the securement structure and the flange for securing the first wooden head to the first end to cover the first open end; and
   wherein the skirt wall includes a plurality of slots for receiving a wedge, the slots being positioned along a side edge of an end plank.

2. The barrel as defined in claim 1, wherein the first wooden head includes a tapered perimeter, wherein a degree of engagement between the first wooden head and the body increases as the first wooden head is urged toward the body.

3. The barrel as defined in claim 1, wherein the first wooden head is formed of a plurality of planks having aligned and adjoined longitudinally extending side edges.

4. The barrel as defined in claim 1, wherein the first open end includes a reinforcement band extending about the perimeter of the sidewall and the flange is secured to the reinforcement band.

5. The barrel as defined in claim 1, wherein the first head retainer has a generally Z-shaped cross-section wherein the top wall extends inwardly from the skirt wall and the securement structure extends outwardly from the skirt wall.

6. The barrel as defined in claim 1, wherein the skirt wall surrounds at least a portion of the first wooden head.

7. The barrel as defined in claim 1, wherein the body interior includes a plurality of wooden staves secured therein.

8. The barrel as defined in claim 7, wherein the side wall includes a first stave holder secured to an inner surface thereof, the stave holder including a plurality of slots, each adapted to receive therethrough one of the plurality of wooden staves.

9. The barrel as defined in claim 8, wherein the first stave holder includes a plurality of resilient clips, with each clip being disposed adjacent one of the plurality of slots for engaging the stave inserted therein.

10. The barrel as defined in claim 9, wherein a second stave holder is secured to an inner surface of the body, the second stave holder including a plurality of slots, each adapted to receive therethrough one of the plurality of staves.

11. The barrel as defined in claim 1, wherein the head assembly includes a gasket disposed between the first open end and the wooden head.

12. The barrel as defined in claim 1, wherein the body includes a second open end opposed from the first open end and a second head assembly including a second wooden head that is removably secured to the body at the second open end to seal the second open end.

13. The barrel as defined in claim 1, wherein the body is formed of stainless steel.

14. The barrel as defined in claim 1, wherein the fastener includes a biasing device disposed about a bolt.

15. The barrel as defined in claim 1, wherein the first head assembly further includes a gas impermeable cover disposed over a portion of the first wooden head, wherein a portion of the first wooden head remains uncovered.

16. A barrel for potable liquids comprising:
a body formed of stainless steel having a sidewall defining an interior and terminating at a first and second opposed open ends;
a first flange extending from and about the sidewall adjacent the first end;
a second flange extending from and about the sidewall adjacent the second end;
a first head assembly including a first wooden head removably secured to the body at the first open end to seal the first open end, the first head assembly including a first head retainer bounding a perimeter of the first wooden head and having a first securement structure extending therefrom;
a second head assembly including a second wooden head removably secured to the body at the second open end to seal the second open end, the second head assembly including a second head retainer bounding a perimeter of the second wooden head and having a second securement structure extending therefrom;
a plurality of first fasteners extending between the first securement structure and the first flange for securing the first head to the first end to cover the first open end, at least one of the plurality of first fasteners includes a fastener biasing device exerting a biasing force on the first head assembly urging the first wooden head into sealing engagement with the body; and
a plurality of second fasteners extending between the second securement structure and the second flange for securing the second head to the second end to cover the second open end, at least one of the plurality of second fasteners includes a fastener biasing device exerting a biasing force on the second head assembly urging the second wooden head into sealing engagement with the body.

17. The barrel as defined in claim 16, wherein the first and second wooden heads have a tapered perimeter, wherein the degree of engagement between the first and second wooden heads and the body increases as the first and second wooden heads are urged toward the body.

18. The barrel as defined in claim 16, wherein the first and second wooden heads are formed of planks with adjoining side edges.

19. The barrel as defined in claim 16, wherein a gasket is disposed between the first open end and the first wooden head.

20. The barrel as defined in claim 16, wherein the first securement structure and the first flange have a plurality of aligned openings for receiving the plurality of first fasteners.

21. The barrel as defined in claim 16, wherein the body first open end includes a first reinforcement band extending about the perimeter of the sidewall and the second body open end includes a second reinforcement band extending about the perimeter of the sidewall, and the first and second flanges are secured to the first and second reinforcement bands respectively.

22. The barrel as defined in claim 16, wherein the body interior includes a plurality of wooden staves secured therein, and wherein the side wall includes a first stave holder secured to an inner surface thereof, the stave holder including a plurality of slots, each adapted to receive therethrough one of the plurality of wooden staves.

23. The barrel as defined in claim 16, wherein the first head retainer includes a top wall and a skirt wall extending therefrom and terminating in the first securement structure, the top wall and skirt wall defining a space to receive the first wooden head therein.

\* \* \* \* \*